(12) United States Patent
Ioppolo et al.

(10) Patent No.: US 10,464,444 B2
(45) Date of Patent: Nov. 5, 2019

(54) CONNECTION ELEMENT HAVING A DRAINAGE OPENING

(71) Applicant: BROSE FAHRZEUGTEILE GMBH & CO. KOMMANDITGESELLSCHAFT, COBURG, Coburg (DE)

(72) Inventors: Leo Ioppolo, Washington, MI (US); Sean Sabo, West Bloomfield, MI (US)

(73) Assignee: Brose Fahrzeugteile GmbH & Co. Kommanditgesellschaft, Coburg, Coburg (DE)

(*) Notice: Subject to any disclaimer, the term of this patent is extended or adjusted under 35 U.S.C. 154(b) by 55 days.

(21) Appl. No.: 15/699,096

(22) Filed: Sep. 8, 2017

(65) Prior Publication Data

US 2019/0077278 A1 Mar. 14, 2019

(51) Int. Cl.
*B60N 2/00* (2006.01)
*B60N 2/005* (2006.01)

(52) U.S. Cl.
CPC .................... *B60N 2/005* (2013.01)

(58) Field of Classification Search
CPC ..................................................... B60N 2/005
See application file for complete search history.

(56) References Cited

U.S. PATENT DOCUMENTS 6,814,399 B2 * 11/2004 Johnson ................ B60S 1/0419
296/192

* cited by examiner

*Primary Examiner* — D Glenn Dayoan
*Assistant Examiner* — Melissa A Black
(74) *Attorney, Agent, or Firm* — Lewis Roca Rothgerber Christie LLP

(57) ABSTRACT

A connection element for connecting vehicle parts to each other comprises: a fastening section operative to be fastened to a first vehicle part, the fastening section comprising a planar face having a first side for abutting the first vehicle part and a second side opposite the first side, the fastening section further comprising a wall section protruding from the planar face at said second side and at least partially bordering the planar face at said second side; a drainage opening formed in the planar face and being surrounded by an edge, the drainage opening being operative to drain liquid from the second side of planar face towards the first side; and an indentation at least partially formed on the planar face in the vicinity of the drainage opening, the edge of the drainage opening extending across the indentation such that the edge of the drainage opening in the region of the indentation is raised towards said second side of the planar face.

11 Claims, 4 Drawing Sheets

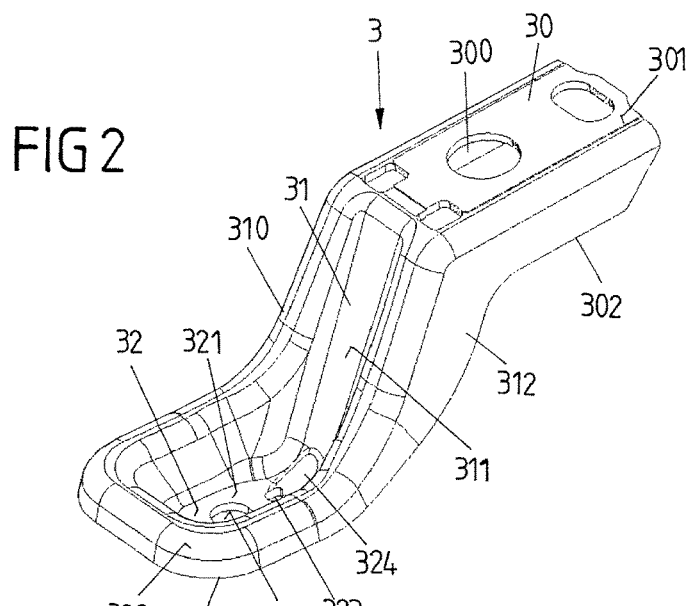
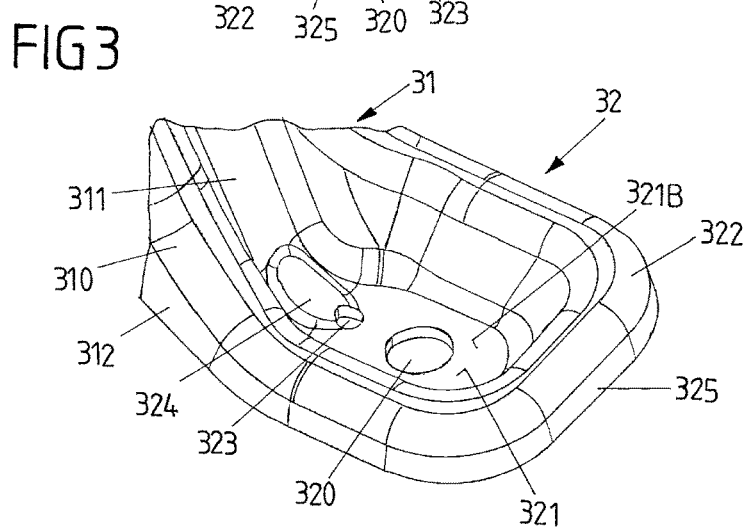
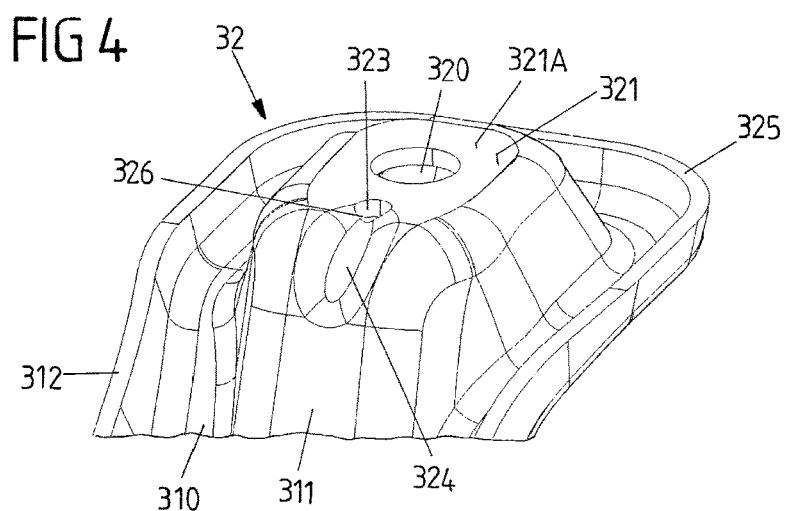

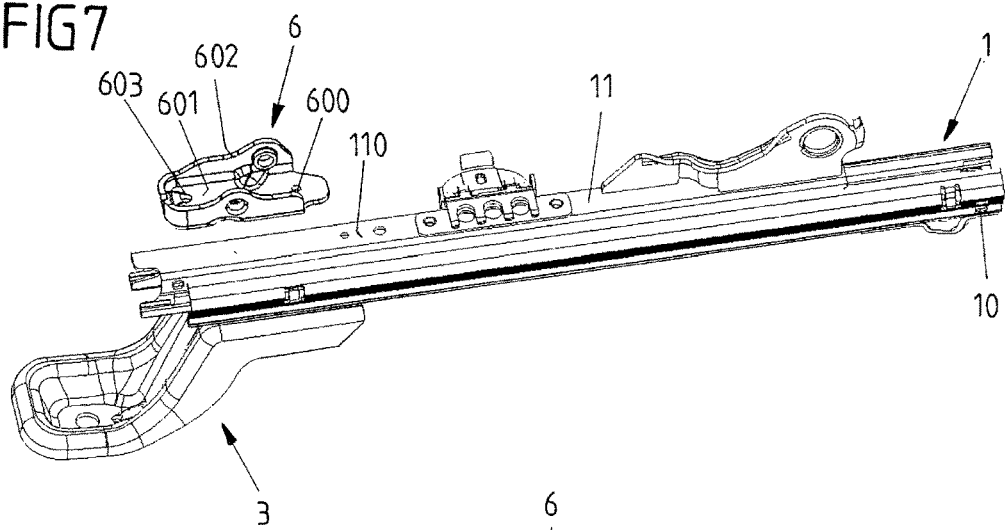
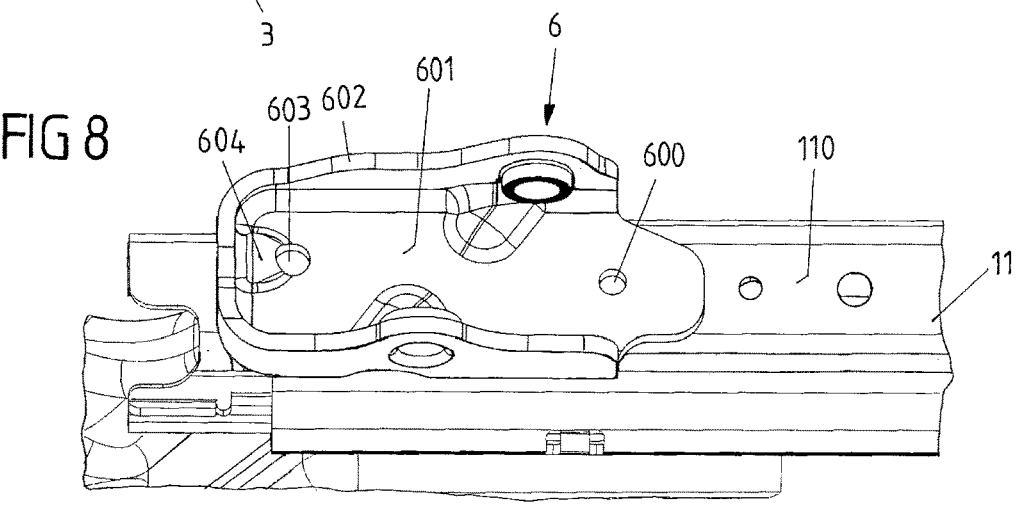
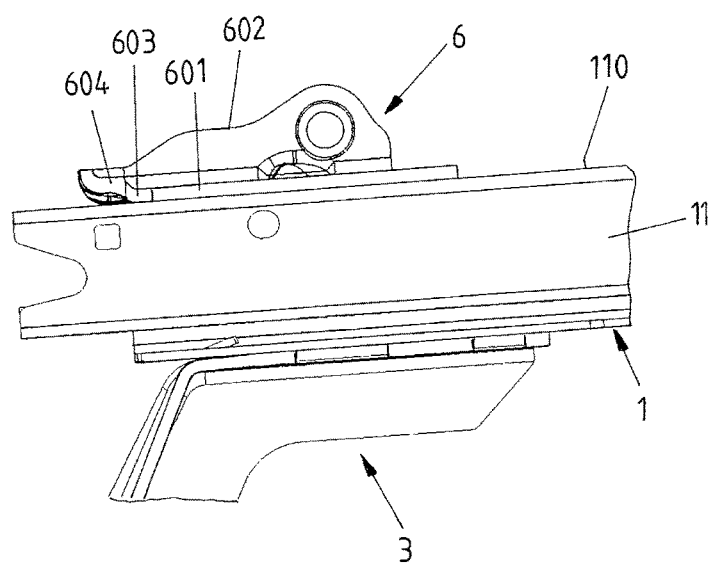

CONNECTION ELEMENT HAVING A DRAINAGE OPENING

TECHNICAL FIELD

The invention relates to a connection element for connecting vehicle parts to each other, to an assembly group of a vehicle seat, and to a method for manufacturing a connection element for connecting vehicle parts to each other.

BACKGROUND

To connect a vehicle seat for example to a vehicle floor, a longitudinal adjustment device of the vehicle seat is fastened to the vehicle floor via connection elements, also denoted as risers. In particular in open-environment vehicles such as off-road vehicles the vehicle seat with its longitudinal adjustment device may be held, by means of the connection elements, above the vehicle floor and above a water line up to which water may potentially rise in the vehicle.

Typically, a connection element of this type comprises a fastening section having a planar face being formed to abut for example the vehicle floor such that, via the planar face, a connection of the connection element to the vehicle floor may be established. To increase the structural strength of the connection element, herein, the planar face may be bordered by a wall section such that the fastening section assumes a cup shape.

Such cup shape however may have the effect that water may be trapped within the fastening section of the connection element if water enters into the vehicle.

SUMMARY OF THE INVENTION

It is an object to provide a connection element which allows for a connection of vehicle parts to each other while reducing the risk of water being trapped in a vehicle in the vicinity of the connection element.

According to a first aspect, a connection element for connecting vehicle parts to each other comprises: a fastening section operative to be fastened to a first vehicle part, the fastening section comprising a planar face having a first side for abutting the first vehicle part and a second side opposite the first side, the fastening section further comprising a wall section protruding from the planar face at said second side and at least partially bordering the planar face at said second side; a drainage opening formed in the planar face and being surrounded by an edge, the drainage opening being operative to drain liquid from the second side of planar face towards the first side; and an indentation at least partially formed on the planar face in the vicinity of the drainage opening, the edge of the drainage opening extending across the indentation such that the edge of the drainage opening in the region of the indentation is raised towards said second side of the planar face.

By forming a drainage opening in the planar face of the connection element water may drain from the planar face of the connection element. When bordered by the wall section, a cup shape may be formed at the planar section, hence causing water to be collected on the planar face if entering into the vehicle. Such water however may drain from the planar face through the drainage opening such that no trapping of water on the planar face occurs.

The planar face abuts the associated vehicle part and hence may be fixed to the vehicle part. In order to allow a draining of water despite the planar abutment of the planar face on the associated vehicle part, an indentation is formed in the vicinity of the drainage opening such that the edge surrounding the drainage opening extends across the indentation and at least in portions is raised with respect to the first side of the planar face. The edge of the drainage opening, in case the connection element is fixed to the associated vehicle part, hence is not in tight abutment with the associated vehicle part, but at least in portions is raised from the vehicle part such that water may freely flow from the region of the fastening section through the drainage opening and hence may drain from the fastening section.

In one embodiment, the indentation has the shape of a gusset. The indentation may be formed on the connection element by stamping such that it reaches at least partially into the planar face and extends to the drainage opening.

In one embodiment, the connection element comprises a carrier section operative to be fastened to a second vehicle part, the carrier section having an abutment face for abutting the second vehicle part. By means of the fastening section, hence, the connection element can be fastened to a first vehicle part, whereas via the carrier section the connection element can be fastened to a second vehicle part. Via the connection element, hence, different vehicle parts can be connected to each other. The connection element, according to this embodiment, may for example function as a riser to connect a longitudinal adjustment device of the vehicle seat to a vehicle floor, the fastening section of the connection element in this case for example being connected to the vehicle floor.

The connection element may further comprise a connection section connecting the fastening section with the carrier section. The connection section, in one embodiment, extends at an angle with respect to the planar face of the fastening section and also to the abutment face of the carrier section and hence provides for a link between the fastening section with its planar face and the carrier section with its abutment face.

In one embodiment, the connection element is integrally formed with its fastening section, its connection section, and its carrier section. The connection element may for example be formed by a deep drawn stamping process.

In one embodiment, the indentation is (also) formed on the connection section. The indentation hence is formed at the boundary between the connection section and the planar face of the fastening section and hence reaches both into the planar face of the fastening section and into the connection section, for example a back face of the connection section.

In one embodiment, the connection section comprises a back face and a wall section at least partially bordering the back face. The wall section of the connection section may adjoin the wall section of the fastening section to increase the structural strength of the connection element.

In yet another embodiment, the planar face comprises a fastening hole for fastening the connection element to said first vehicle part using a fastening assembly. For fastening the connection element to the associated first vehicle part, for example a screw-nut type connection may be used, the screw extending through the fastening hole and being fixed by means of a nut for clampingly attaching the fastening section of the connection element to the associated vehicle part.

According to another aspect, an assembly group of a vehicle seat comprises: a longitudinal adjustment device having a an upper guide rail carrying a seat structure of the vehicle seat and a lower guide rail slidably guiding the upper guide rail; and a connection element of the type described above fastened to the lower guide rail to connect the lower guide rail to a vehicle floor.

According to yet another aspect, an assembly group of a vehicle seat comprises: a longitudinal adjustment device having a an upper guide rail carrying a seat structure of the vehicle seat and a lower guide rail slidably guiding the upper guide rail; and the connection element of the type described above fastened to the upper guide rail to connect the seat structure to the upper guide rail.

According to yet another aspect, a method for manufacturing a connection element for connecting vehicle parts to each other comprises: forming a fastening section of the connection element by forming a planar face having a first side for abutting a first vehicle part and a second side opposite the first side, and by forming a wall section protruding from the planar face at said second side and at least partially bordering the planar face at said second side; forming a drainage opening in the planar face, the draining opening being surrounded by an edge, the drainage opening being operative to drain liquid from the second side of planar face towards the first side; and forming an indentation in the vicinity of the drainage opening, the edge of the drainage opening extending across the indentation such that the edge of the drainage opening in the region of the indentation is raised towards said second side of the planar face.

The connection element may for example be formed in a deep drawn stamping process as an integral piece.

The fastening section with its planar face and the wall section surrounding the planar face herein may be formed by a deep drawn stamping process, whereas the drainage opening may be formed in a subsequent step for example by a punching process. In one embodiment, the indentation is formed by a stamping process subsequently to forming the drainage opening in the planar face such that the indentation reaches to the drainage opening to raise the edge of the drainage opening with respect to the first side of the drainage opening.

When forming the drainage opening by punching, in one embodiment the punching process may include a punching operation directed from the second side of the planar face towards the first side. In this way the drainage opening is formed to comprise rounded edges at the second side of the planar face, possibly allowing for an improved drainage of water from the region of the fastening section of the connection element.

It is to be noted that the drainage opening may be formed by another process than a punching process, for example a drilling process or the like.

BRIEF DESCRIPTION OF THE DRAWINGS

The various features and advantages of the present invention may be more readily understood with reference to the following detailed description and the embodiments shown in the drawings. Herein.

FIG. 2 shows a view of a connection element constituting a riser for connecting the longitudinal adjustment device to the vehicle floor;

FIG. 3 shows an enlarged view of a portion of the connection element;

FIG. 4 shows a view of the connection element, at a bottom side;

FIG. 7 shows a view of a longitudinal adjustment device, comprising a connection element according to another embodiment for connecting a seat structure to the longitudinal adjustment device;

FIG. 8 shows an enlarged view of the connection element placed on an upper guide rail of the longitudinal adjustment device; and FIG. 9 shows a sectional side view of the connection element on placed on the upper guide rail of the longitudinal adjustment device.

DETAILED DESCRIPTION

Figure 1:
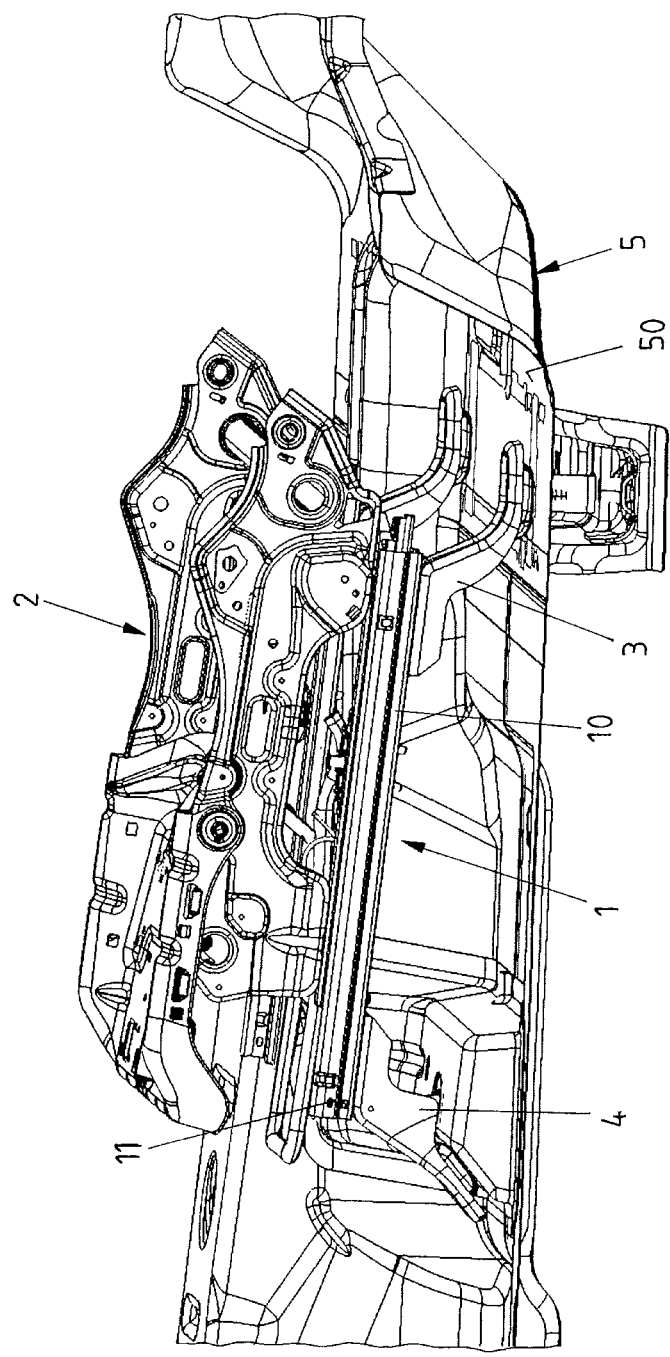
FIG. 1 shows a view of a vehicle seat structure comprising risers to connect a longitudinal adjustment device the vehicle to a vehicle floor.

Subsequently, embodiments of the invention shall be described in detail with reference to the drawings. In the drawings, like reference numerals designate like structural elements.

It is to be noted that the embodiments are not limiting for the invention, but merely represent illustrative examples.

FIG. 1 shows a view of an assembly group of a vehicle, the assembly group comprising a seat structure 2 connected to a vehicle floor 50 of a vehicle structure 5 by means of a longitudinal adjustment device 1. The longitudinal adjustment device 1 comprises two pairs of guide rails 10, 11, each pair comprising an upper guide rail 11 connected to the seat structure 2 for carrying the seat structure 2 and a lower guide rail 10 slidably guiding the associated upper guide rail 11.

An assembly group as shown in FIG. 1 may for example be used in an open-environment vehicle such as an off-road vehicle being designed to allow for example water to enter into the vehicle. For this, the pairs of guide rails 10, 11 of the longitudinal adjustment device 1 are connected to the vehicle floor 50 by means of connection elements in the shape of rear risers 3 and front risers 4 carrying the longitudinal adjustment device 1 such that it is held above the vehicle floor 50.

The longitudinal adjustment device 1 may for example allow for a longitudinal adjustment of the position of the seat structure 2 within the vehicle. The longitudinal adjustment device 1 may for example comprise a mechanical locking which manually may be released such that a passenger may move upper guide rails 11 with respect to the lower guide rails 10 for longitudinally adjusting the position of the vehicle seat.

FIGS. 2 to 6 show views of an embodiment of a connection element 3 used as a rear riser in the arrangement of FIG. 1.

The connection element 3 comprises a carrier section 30 forming an abutment face 301 designed to abut an associated lower guide rail 10 and having a fastening hole 300 via which a fastening connection, for example by using a screw-nut-type assembly, with the associated lower guide rail 10 may be established.

The connection of the carrier section 30 of the connection element 3 to the lower guide rail 10 can, instead of using a fastener such as a screw-nut type connection, also be established using a welding method, in particular laser welding to form a laser weld.

Figure 5:
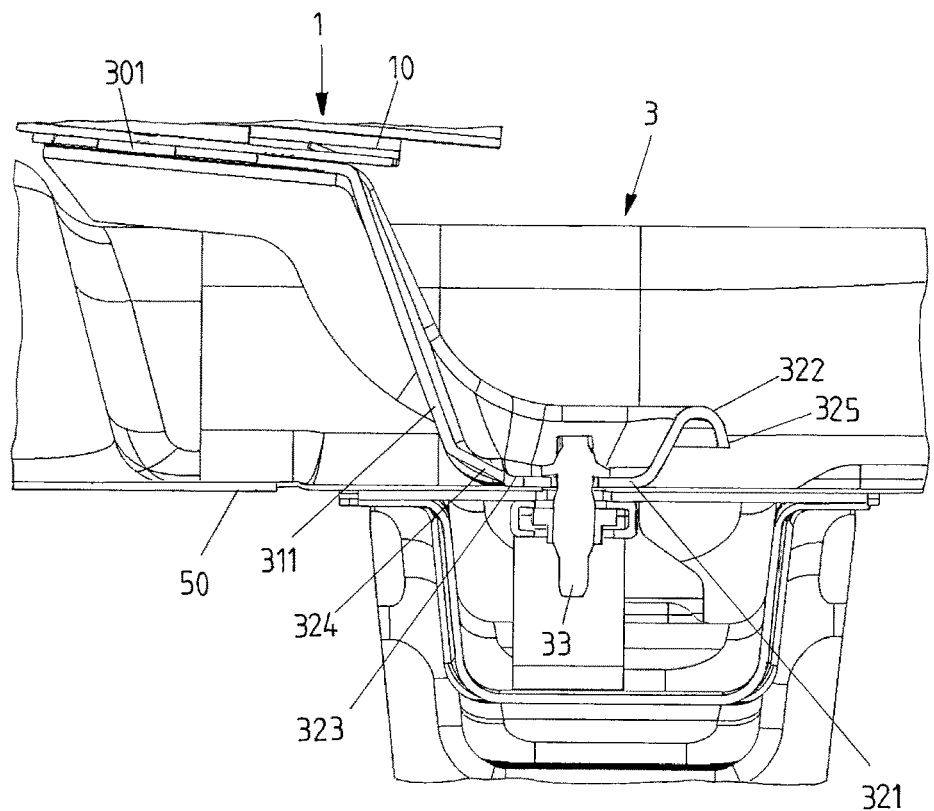
FIG. 5 shows a sectional view of the connection element.
Figure 6:
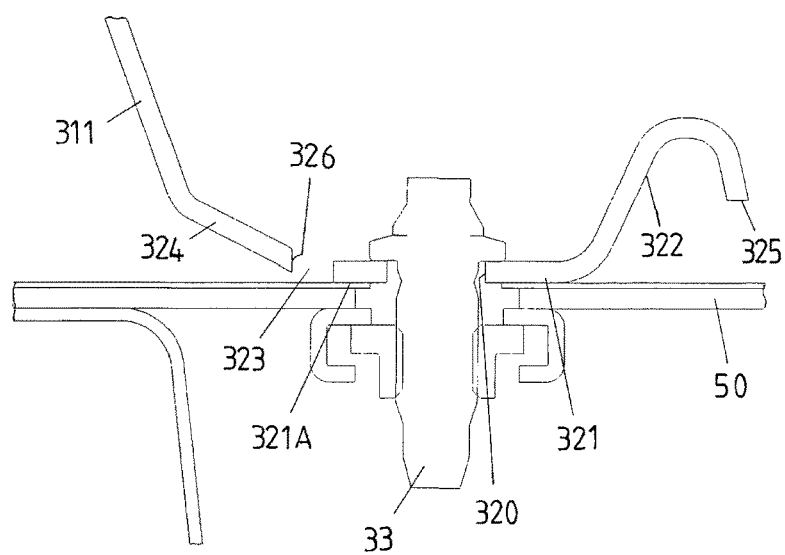
FIG. 6 shows another sectional view of the connection element.

The connection element 3 furthermore comprises a fastening section 32 having a planar face 321 designed to abut the vehicle floor 50 with a first, bottom side 321A (see FIG. 4). In the planar face 321, a fastening opening 320 is formed via which a fastening connection with the vehicle floor 50 may be established, for example using a screw-nut-type connection 33 as shown in FIGS. 5 and 6.

The fastening section 32 is connected to the carrier section 30 by means of a connection section 31 extending at an angle with respect to the planar face 321 of the fastening section 32 and the abutment section 301 of the carrier section 30. The connection section 31 provides for a link between the fastening section 32 and the carrier section 30 raising the carrier section substantially above the level of the fastening section 32.

The fastening section 32 is bordered by a wall section 322 which surrounds the planar face 321 and is adjoined on each lateral side by a wall section 310 bordering a back face 311 of the connection section 31. The wall section 322 protrudes from the planar face 321 at a second side 321B opposite to the first side 321A such that the fastening section 32 has a cup shape. The wall section 322 herein is rounded such that a surrounding edge 325 points backwards towards the first side 321A of the planar face 321. The edge 325 of the wall section 322 is adjoined, on each lateral side, by a web section 312 of the connection section 31, the web section 312 on each lateral side being adjoined by a web section 302 protruding from the abutment face 301 of the carrier section 30 towards a rear side opposite to the associated lower guide rail 10 to which the carrier section 30 is to be fastened.

The entire connection element 3 may for example be formed in a deep drawn stamping process. The connection element 3 herein may be formed as an integral metal part, the wall sections 310, 322 and the web sections 302, 312 adding to the three-dimensional structural stability of the connection element 3 such that loads acting on the seat structure 2 may be received and diverted, amongst others, by means of the connection elements 3 forming the rear risers of the assembly group shown in FIG. 1.

Because the fastening section 32 has a cup shape, water entering into a vehicle may be collected within the fastening section 32 on the planar face 321. In order to allow water to drain from the planar face 321, a drainage opening 323 is formed on the planar face 321, as shown for example in FIGS. 3 and 4, the drainage opening 323 extending through the planar face 321 and formed for example by punching within the planar face 321.

Because the planar face 321, with its first side 321A, is to be brought into abutment with the vehicle floor 50, an indentation 324 in the shape of a gusset is formed at the transitioning region in between the planar face 321 of the fastening section 32 and the back face 311 of the connection section 31. The indentation 324 is formed by stamping at the first side 321A of the planar face 321 and reaches to the drainage opening 323 such that an edge 326 surrounding the drainage opening 323 extends across the indentation 324 and hence is raised with respect to the first side 321A of the planar face 321, as this is visible for example from FIGS. 3 and 6.

Because the edge 326 of the drainage opening 323 is partially raised with respect to the first side 321A of the planar face 321, water may freely flow out of the region of the second side 321B of the planar face 321 towards the first side 321A such that water may be drained from the region of the fastening section 32. A trapping of water within the fastening section 32 thus is prevented.

The connection element 3 in the example of FIGS. 2 to 6 serves to connect a longitudinal adjustment device 1 to a vehicle floor 50, as this is shown in FIG. 1. In an embodiment shown in FIGS. 7 to 9, in contrast, a connection element 6 serves as an attachment piece to connect structural parts to an upper guide rail 11 of a longitudinal adjustment device 1.

The connection element 6 comprises a planar face 601 being partially surrounded by a wall section 602 protruding from the planar face 601. An opening 600 is formed in the planar face 601 which may form an opening through which water may drain from the connection element 6 if aligned with a corresponding opening in the upper face 110 of the upper guide rail 11. The connection element 6 may be connected to the upper guide rail 11 for example by means of welding, in particular laser welding.

At a lower end of the connection element 6 (see FIG. 9) a drainage opening 603 is formed which reaches through the planar face 601 and which serves to allow a draining of water from the (partially) cup-shaped connection element 6 in particular at the lower end. An indentation 604 is formed on the planar face 601 reaching to the drainage opening 603 such that an edge surrounding the drainage opening 603 is partially raised in order to allow water to flow out of the region of the connection element 6 even when the planar face 601 of the connection element 6 abuts the associated upper face 110 of the upper guide rail 11, as this is shown for example in FIG. 9.

The connection element 6 of the embodiment of FIGS. 7 to 9 may, similar to the connection element 3 described in relation to FIGS. 2 to 6, be manufactured by a deep drawn stamping process.

The embodiments described above shall not be limiting for the invention, but rather the invention may be implemented also in entirely different embodiments.

Connection elements of a similar type and/or structure may be used to also connect other vehicle parts to each other.

A connection element of the type described herein in principle may also be used in a vehicle apart from a vehicle seat to connect structures to each other.

REFERENCE NUMERALS

1 Longitudinal adjustment device
10 Lower guide rail
11 Upper guide rail
110 Top face
2 Seat structure
3 Connection element (rear riser)
30 Carrier section
300 Fastening hole
301 Abutment face
302 Web section
31 Connection section
310 Wall section
311 Planar face
312 Web section
32 Fastening section
320 Fastening hole
321 Back face
321A, 321B Side
322 Wall section
323 Drainage opening
324 Indentation (gusset)
325 Rim
326 Edge
33 Fastening assembly (screw-nut connection)
4 Front riser
5 Vehicle structure
50 Vehicle floor
6 Connection element
600 Hole
601 Planar face
602 Wall section 603 Drainage opening
604 Gusset

What we claim is:

1. A connection element for connecting vehicle parts to each other, the connection element comprising:
 a fastening section operative to be fastened to a first vehicle part, the fastening section comprising a planar face having a first side for abutting the first vehicle part and a second side opposite the first side, the fastening section further comprising a wall section protruding from the planar face at said second side and at least partially bordering the planar face at said second side;
 a drainage opening formed in the planar face and being surrounded by an edge, the drainage opening being operative to drain liquid from the second side of planar face towards the first side; and
 an indentation having the shape of a gusset and being at least partially formed on the planar face in the vicinity of the drainage opening, the edge of the drainage opening extending across the indentation such that the edge of the drainage opening in the region of the indentation is raised towards said second side of the planar face.

2. The connection element according to claim 1, further comprising a carrier section operative to be fastened to a second vehicle part, the carrier section having an abutment face for abutting the second vehicle part.

3. The connection element according to claim 2, further comprising a connection section extending at an angle with respect to the planar face of the fastening section and connecting the fastening section with the carrier section.

4. The connection element according to claim 3, wherein the indentation is at least partially formed on the connection section.

5. The connection element according to claim 3, wherein the connection section comprises a back face and a wall section at least partially bordering the back face.

6. The connection element according to claim 1, wherein the planar face comprises a fastening hole for fastening the connection element to said first vehicle part using a fastening assembly.

7. An assembly group of a vehicle seat, the assembly group comprising:
 a longitudinal adjustment device having an upper guide rail carrying a seat structure of the vehicle seat and a lower guide rail slidably guiding the upper guide rail; and
 a connection element fastened to the lower guide rail to connect the lower guide rail to a vehicle floor, the connection element comprising:
 a fastening section operative to be fastened to a first vehicle part, the fastening section comprising a planar face having a first side for abutting the first vehicle part and a second side opposite the first side, the fastening section further comprising a wall section protruding from the planar face at said second side and at least partially bordering the planar face at said second side;
 a drainage opening formed in the planar face and being surrounded by an edge, the drainage opening being operative to drain liquid from the second side of planar face towards the first side; and
 an indentation at least partially formed on the planar face in the vicinity of the drainage opening, the edge of the drainage opening extending across the indentation such that the edge of the drainage opening in the region of the indentation is raised towards said second side of the planar face.

8. An assembly group of a vehicle seat, the assembly group comprising:
 a longitudinal adjustment device having an upper guide rail carrying a seat structure of the vehicle seat and a lower guide rail slidably guiding the upper guide rail; and
 a connection element fastened to the upper guide rail to connect the seat structure to the upper guide rail, the connection element comprising:
 a fastening section operative to be fastened to a first vehicle part, the fastening section comprising a planar face having a first side for abutting the first vehicle part and a second side opposite the first side, the fastening section further comprising a wall section protruding from the planar face at said second side and at least partially bordering the planar face at said second side;
 a drainage opening formed in the planar face and being surrounded by an edge, the drainage opening being operative to drain liquid from the second side of planar face towards the first side; and
 an indentation at least partially formed on the planar face in the vicinity of the drainage opening, the edge of the drainage opening extending across the indentation such that the edge of the drainage opening in the region of the indentation is raised towards said second side of the planar face.

9. A method for manufacturing a connection element for connecting vehicle parts to each other, the method comprising:
 forming a fastening section of the connection element by forming a planar face having a first side for abutting a first vehicle part and a second side opposite the first side, and by forming a wall section protruding from the planar face at said second side and at least partially bordering the planar face at said second side;
 forming a drainage opening in the planar face, the draining opening being surrounded by an edge, the drainage opening being operative to drain liquid from the second side of planar face towards the first side; and
 forming an indentation having the shape of a gusset and being in the vicinity of the drainage opening, the edge of the drainage opening extending across the indentation such that the edge of the drainage opening in the region of the indentation is raised towards said second side of the planar face.

10. The method according to claim 9, wherein the drainage opening is formed in a first step and the indentation is formed in a second step after the first step.

11. The method according to claim 9, wherein the drainage opening is formed in the planar face of the fastening section by punching in a punching direction directed from the second side towards the first side.

* * * * *